(No Model.)
J. H. BERKSHIRE.
FEED WATER HEATER AND PURIFIER.
No. 293,622. Patented Feb. 19, 1884.
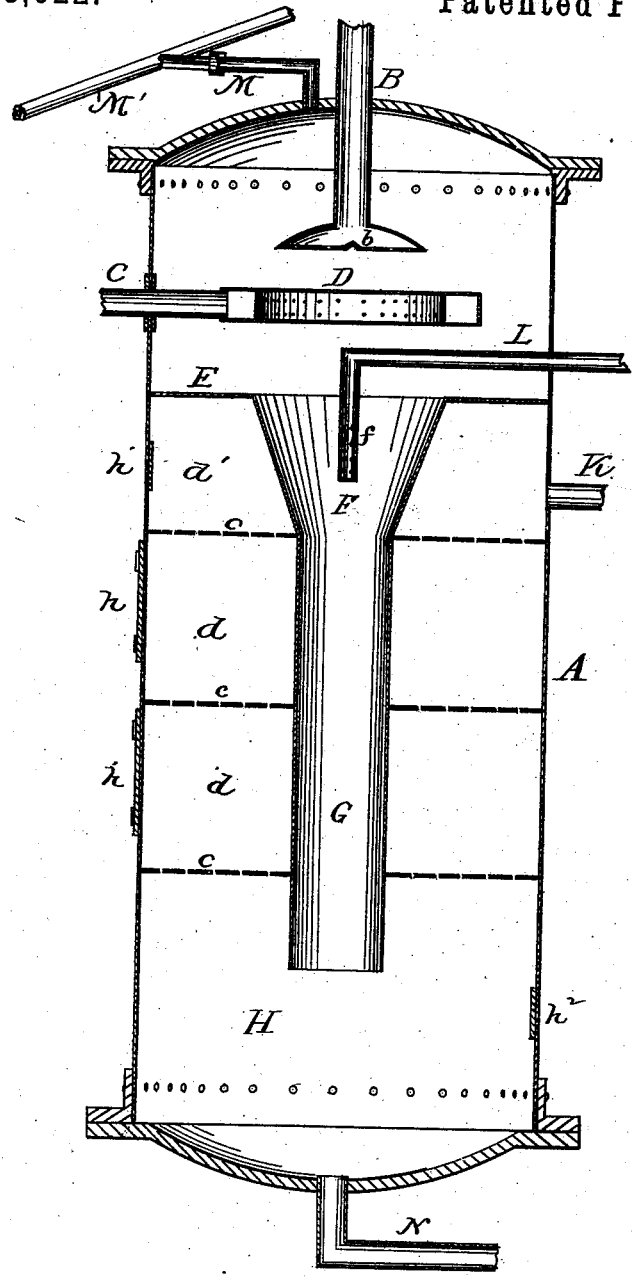

UNITED STATES PATENT OFFICE.

JOHN H. BERKSHIRE, OF MUSCATINE, IOWA, ASSIGNOR TO THE KENNEDY & BERKSHIRE FEED WATER HEATER AND FILTER MANUFACTURING COMPANY.

FEED-WATER HEATER AND PURIFIER.

SPECIFICATION forming part of Letters Patent No. 293,622, dated February 19, 1884.

Application filed September 27, 1883. (No model.)

*To all whom it may concern:*

Be it known that I, JOHN H. BERKSHIRE, a citizen of the United States of America, residing at Muscatine, in the county of Muscatine and State of Iowa, have invented certain new and useful Improvements in Feed-Water Heaters and Purifiers, of which the following is a specification, reference being had therein to the accompanying drawing.

My invention relates to feed-water pressure-heaters, adapted for heating and purifying feed-water by live steam introduced directly from the boiler, and brought into direct contact with the water sprayed into the heater, where the conditions are such that no exhaust-steam is available—viz., where no engines or condensing-engines are used.

The accompanying drawing represents a vertical central section of the feed-water heater and purifier.

A is a vertical cylindrical vessel, constructed, in a well-known manner, of plate iron or steel.

B is the cold-water-supply pipe extended through the top of the vessel and provided at the lower end with a perforated sprayer, $b$, by which the water is sprayed into the vessel.

C is a steam-pipe of suitable size, leading directly from the boiler into the circular perforated receiver D, by means of which the live steam is introduced and distributed into the vessel in direct contact with the falling water.

E is a diaphragm dividing the vessel into two compartments, connected with each other only through the central scum-chamber, F, and tube or pipe G, leading into the precipitating-chamber H, which communicates through the perforated plates $c\ c\ c$ with the filtering-chambers $d\ d$ and pure-water chamber $d'$.

K is the feed-water pipe leading from the pure-water chamber $d'$ into the boiler. (Not shown.)

L is a scum-pipe having the vertical perforated portion $f$ arranged in and extending downward partly through the center of the scum-chamber F. The vertical perforated portion of the scum-pipe is required to be of such length and in such position in relation to the water in the heater as will enable it to take its supply from the surface, and thus remove the scum.

M is an escape-gas pipe connecting the top of the heater with the pipe M', leading from the boiler to the engine, or with any other circulating-pipe, for the purpose of carrying off any gases which may be generated or released by the action of steam upon the water. The filtering-chambers are provided with man-holes $h\ h$ for packing purposes. The pure-water chamber $d'$ and precipitating-chamber H are provided with openings $h'\ h^2$, to admit into each a stream of water for washing out the chambers.

N is a blow-off pipe at the bottom of the heater, through which the accumulated impurities may be blown off. The cold water descending through the pipe B is sprayed into the vessel through the sprayer $b$, and the live steam entering through the pipe C into the receiver and distributer D is brought in direct contact with the sprayed water, and the water, being thus thoroughly heated, falls upon diaphragm E and into the scum-chamber F, and descends through the tube G into the precipitating-chamber H, and thence rises through perforated plates $c\ c\ c$ into the filtering-chambers $d\ d$ and pure-water chamber $d'$. As the water ascends from chamber H, the released impurities, which will neither precipitate nor float, will be intercepted in the upward passage through the filters, and the water will enter the chamber $d'$ in a practically-pure state, and will be thence conveyed to the boiler through the pipe $k$. In the contact between the steam and water more or less gases will be generated or released, and will naturally ascend to the top of the vessel, and will be carried out of the vessel through the pipe M, thus preventing such gases from entering the boiler.

It will be observed that the horizontal portion L of the blow-off pipe is located above the water-line in the heater, and the vertical portion $f$ of this pipe extends downward in the center of the scum-chamber, and is perforated from the water-line downward to its closed end. The scum-chamber consisting of the mouth of a comparatively-small central tube, through which all the water is conveyed, there is constantly a strong downward current drawing the scum to the center of the scum-chamber, and possibly some portions of the scum may be thus carried some distance down the central tube. The heater being under the steam-supply boiler-pressure, when the valve of the scum-blow-off pipe is opened, water and scum will be forced upward and outward through the blow-off pipe $f$ L, and when the water in the chamber F falls below the upper perforations in the vertical portion $f$, steam will pass through those perforations, which will form a current of steam toward the pipe, carrying off all the scum which may be upon the surface of the water. The scum which may be carried down the central tube below all the perforations in the portion $f$ of the pipe will be removed by the upward and outward flow of the steam, which will be produced through the pipe when the water falls below the perforated portion $f$.

I claim—

1. In a feed-water heater having the scum-chamber F, consisting of the mouth of the central tube, G, the scum-blow-off pipe consisting of the horizontal portion L, arranged above the water-line, and of the vertical portion $f$, extended downward in the center of the scum-chamber, and perforated from the water-line downward to its closed end, substantially as and for the purposes set forth.

2. In a feed-water pressure-heater, the escape-pipe M, connecting the water and steam receiving chamber of the heater with a steam-circulating pipe, M', in combination with the live-steam-induction pipe C, substantially as and for the purposes described.

In testimony whereof I have affixed my signature in presence of two witnesses.

JOHN H. BERKSHIRE.

Witnesses:
T. R. FITZGERALD,
C. E. STEWART.